Nov. 15, 1960     A. I. ZAGAR     2,960,344
ADJUSTABLE COLLET-TYPE CHUCK
Filed Sept. 23, 1959
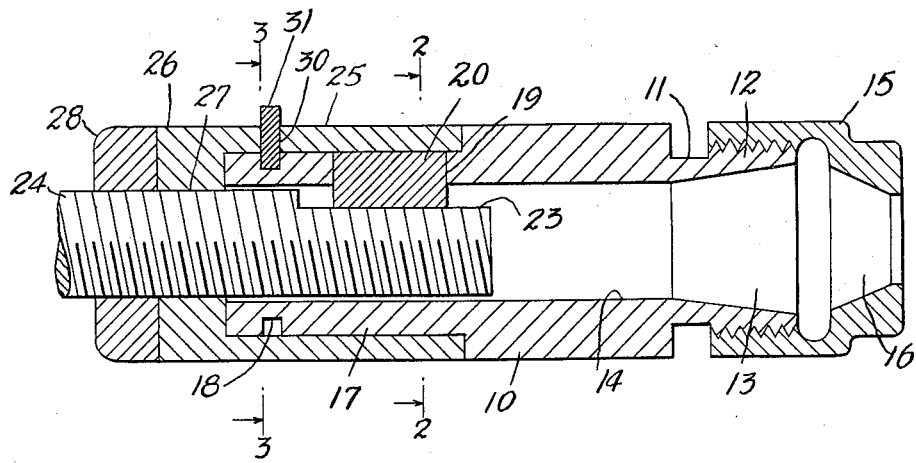
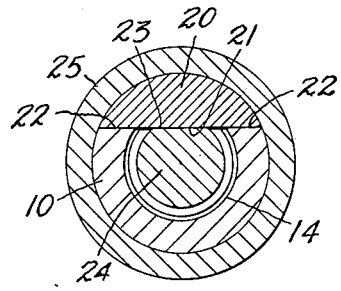
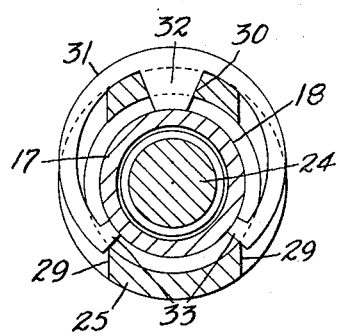
INVENTOR.
ASHER I. ZAGAR
BY
Howard E. Thompson
ATTORNEY United States Patent Office 2,960,344
Patented Nov. 15, 1960

2,960,344

ADJUSTABLE COLLET-TYPE CHUCK

Asher I. Zagar, Brooklyn, N.Y., assignor to Ettco Tool & Machine Co., Inc., Brooklyn, N.Y., a corporation of New York Filed Sept. 23, 1959, Ser. No. 841,842

5 Claims. (Cl. 279—97)

This invention relates to chuck devices of the collet-type employing means for adjusting the chuck longitudinally with respect to the spindle for positioning of the chuck or the tool supported thereby.

More particularly, the invention deals with means for quickly coupling and uncoupling the chuck body with respect to the spindle in adjustments of the chuck body on the spindle.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged longitudinal sectional view through a collet-type chuck made according to my invention, with parts of the construction shown in elevation and omitting the chuck member of the device.

Fig. 2 is a section on the line 2—2 of Fig. 1; and

Fig. 3 is a section on the line 3—3 of Fig. 1.

At 10 I have shown the body of the chuck, the body having a collar 11, outwardly of which is an enlarged externally threaded portion 12, having an outwardly flared bore 13. The bore 13 registers with the bore 14 of the body 10. At 15 is shown a chuck supporting and locking nut adjustable on the threaded portion 12, the nut 15 having a conical bore 16 to operatively engage the chuck. In the drawing, the chuck is omitted, as it forms no part of the present invention, but these devices are commonly known in the art.

The body 10 has a reduced upper portion 17 having an annular groove 18 therein and a cutout portion, as at 19, to receive a key 20 adapted to extend into the bore 14, the key having a flat surface, as at 21, note Fig. 2, engaging the walls 22 of the reduced portion 17 and also a flat 23 formed by the cutout portion on the threaded spindle 24, as clearly illustrated in Fig. 1 of the drawing.

Mounted on the reduced portion 17 of the body 10 is a collet or sleeve 25, having a partially closed end forming a head portion 26 in threaded engagement with the spindle 24, as diagrammatically illustrated at 27 in Fig. 1 of the drawing.

Outwardly of the collet 25 is a retaining nut 28 also in threaded engagement with the spindle 24. It will be noted, from a consideration of Fig. 1 of the drawing, that the spindle has clearance in the bore 14. While this clearance is slight, it is exaggerated for clarity in the enlarged drawing.

The collet 25 has, intermediate its ends, side cutouts, as at 29, note Fig. 3 of the drawing, and intermediate these cutouts one wall has a bevelled wall aperture 30, the aperture 30 and the cutouts 29 being adapted to receive a spring key or lock ring 31 having, centrally of its inner surface, a projecting lug 32 extending into the cutout 30 and the annular groove 18 of the reduced portion 17 of the body 10. Also extending into the annular groove 18 are inwardly projecting lugs 33 at the terminal ends of the lock ring 31, as clearly noted in Fig. 3 of the drawing.

With my improved construction, whenever it is desirable to disassemble the body 10 with respect to the spindle, the ring 31 is detached, thus releasing the body 10, permitting free detachment with respect to the collet 25 and spindle 24. In this connection, it will be understood that the key 20 will slide freely off the end of the spindle 24. The extension of the cutout or flat 23 to the end of the spindle facilitates the above operation. It will also appear that the end of the collet is so positioned as to facilitate placement of the key 20 on the flat 23 of the spindle and to slide the key into the collet in reassembling the body 10 with the collet.

In making adjustments, all that is necessary is to loosen the nut 28 to free the collet 25; whereupon, the collet may be adjusted in either direction on the spindle 24 and, when the adjustment has been made, the nut 28 is returned to operative engagement with the collet to retain the same in the adjusted position. In this connection, suitable means, as known in the art, can be employed to retain the setting of the collet 25 by markings on the alined surfaces of the collet 25 and body 10. Accordingly, relatively fine adjustments of the chuck device can be attained.

Having fully described my invention what I claim as new and desire to secure by Letters Patent is:

1. An adjustable chuck comprising a chuck body having an elongated bore, one end of the bore opening into a flared externally threaded chuck supporting portion, the other end of the body having a reduced portion, an annular groove in said reduced portion, a cutout in the reduced portion adjacent said annular groove, a sleeve mounted on said reduced portion, said sleeve having a partially closed end, an externally threaded spindle adjustable longitudinally of the body, means arranged in the cutout of said reduced portion operatively engaging the spindle to key the same against rotation in said body, said end of the sleeve being in threaded engagement with the spindle, means for retaining the sleeve in adjusted position on said spindle, and means mounted in the sleeve and operating in the annular groove of said reduced portion to adjustably couple said body with said sleeve.

2. An adjustable chuck comprising a chuck body having an elongated bore, one end of the bore opening into a flared externally threaded chuck supporting portion, the other end of the body having a reduced portion, an annular groove in said reduced portion, a cutout in the reduced portion adjacent said annular groove, a sleeve mounted on said reduced portion, said sleeve having a partially closed end, an externally threaded spindle adjustable longitudinally of the body, means arranged in the cutout of said reduced portion operatively engaging the spindle to key the same against rotation in said body, said end of the sleeve being in threaded engagement with the spindle, means for retaining the sleeve in adjusted position on said spindle, means mounted in the sleeve and operating in the annular groove of said reduced portion to adjustably couple said body with said sleeve, and said last named means comprising a spring lock ring mounted in the sleeve and having circumferentially spaced lugs extending into the annular groove of said reduced portion.

3. An adjustable chuck comprising a chuck body having an elongated bore, one end of the bore opening into a flared externally threaded chuck supporting portion, the other end of the body having a reduced portion, an annular groove in said reduced portion, a cutout in the reduced portion adjacent said annular groove, a sleeve mounted on said reduced portion, said sleeve having a partially closed end, an externally threaded spindle adjustable longitudinally of the body, means arranged in the cutout of said reduced portion operatively engaging the spindle to key the same against rotation in said body, said end of the sleeve being in threaded engagement with the spindle, means for retaining the sleeve in adjusted position on said spindle, means mounted in the sleeve and operating in the annular groove of said reduced portion to adjustably couple said body with said sleeve, and said first named means comprising a key supported in the cutout of said reduced portion and having a flat wall operatively engaging a flat cutout on said spindle.

4. An adjustable chuck comprising a chuck body having an elongated bore, one end of the bore opening into a flared externally threaded chuck supporting portion, the other end of the body having a reduced portion, an annular groove in said reduced portion, a cutout in the reduced portion adjacent said annular groove, a sleeve mounted on said reduced portion, said sleeve having a partially closed end, an externally threaded spindle adjustable longitudinally of the body, means arranged in the cutout of said reduced portion operatively engaging the spindle to key the same against rotation in said body, said end of the sleeve being in threaded engagement with the spindle, means for retaining the sleeve in adjusted position on said spindle, means mounted in the sleeve and operating in the annular groove of said reduced portion to adjustably couple said body with said sleeve, said first named means comprising a key supported in the cutout of said reduced portion and having a flat wall operatively engaging a flat cutout on said spindle, and the flat cutout of said spindle extending to the end thereof facilitating attachment and detachment of said body and key with said spindle.

5. An adjustable chuck comprising a chuck body having an elongated bore, one end of the bore opening into a flared externally threaded chuck supporting portion, the other end of the body having a reduced portion, an annular groove in said reduced portion, a cutout in the reduced portion adjacent said annular groove, a sleeve mounted on said reduced portion, said sleeve having a partially closed end, an externally threaded spindle adjustable longitudinally of the body, means arranged in the cutout of said reduced portion operatively engaging the spindle to key the same against rotation in said body, said end of the sleeve being in threaded engagement with the spindle, means for retaining the sleeve in adjusted position on said spindle, means mounted in the sleeve and operating in the annular groove of said reduced portion to adjustably couple said body with said sleeve, said first named means comprising a key supported in the cutout of said reduced portion and having a flat wall operatively engaging a flat cutout on said spindle, the flat cutout of said spindle extending to the end thereof facilitating attachment and detachment of said body and key with said spindle, said spindle being freely movable in the bore of said body, and said sleeve enveloping said key.

References Cited in the file of this patent
UNITED STATES PATENTS

| 2,667,687 | Clarkson | Feb. 2, 1954 |
| 2,894,759 | De Bruin | July 14, 1959 |